US012565153B2

(12) United States Patent
    Praat

(10) Patent No.: US 12,565,153 B2
(45) Date of Patent: Mar. 3, 2026

(54) APPARATUS FOR A VEHICLE

(71) Applicant: Christopher Walker Praat, Leighton Buzzard (GB)

(72) Inventor: Christopher Walker Praat, Leighton Buzzard (GB)

( * ) Notice: Subject to any disclaimer, the term of this patent is extended or adjusted under 35 U.S.C. 154(b) by 368 days.

(21) Appl. No.: 18/036,251

(22) PCT Filed: Nov. 12, 2021

(86) PCT No.: PCT/GB2021/052934
    § 371 (c)(1),
    (2) Date: May 10, 2023

(87) PCT Pub. No.: WO2022/106812
    PCT Pub. Date: May 27, 2022

(65) Prior Publication Data
    US 2023/0415661 A1     Dec. 28, 2023

(30) Foreign Application Priority Data
    Nov. 18, 2020     (GB) ...................................... 2018147

(51) Int. Cl.
    *B60R 9/055*     (2006.01)
    *B60P 3/34*      (2006.01)
    *B60R 9/04*      (2006.01)
    *B60R 9/06*      (2006.01)
(52) U.S. Cl.
    CPC .............. *B60R 9/055* (2013.01); *B60P 3/341*
        (2013.01); *B60P 3/343* (2013.01); *B60R 9/065*
        (2013.01); *B60P 3/34* (2013.01); *B60R 9/04*
        (2013.01); *B60R 9/06* (2013.01)

(58) Field of Classification Search
    CPC ........... B60R 9/055; B60R 9/06; B60R 9/065;
        B60R 9/04; B60P 3/341; B60P 3/343;
        E04H 15/06
    See application file for complete search history.

(56) References Cited

U.S. PATENT DOCUMENTS 3,403,935 A * 10/1968 Spradling ............... B60P 3/341
                                                        135/88.15
4,294,486 A * 10/1981 Espejo .................... E04H 15/32
                                                        135/88.15

(Continued)

FOREIGN PATENT DOCUMENTS

FR          2727069 A1 *  5/1996  ................ B60P 3/34
WO    WO-2014204306 A1 * 12/2014  .............. B60P 3/341

OTHER PUBLICATIONS

International Search Report for PCT Application No. PCT/GB2021/052934 dated Jan. 27, 2022.

(Continued)

*Primary Examiner* — Patricia L Engle
(74) *Attorney, Agent, or Firm* — MacCord Mason PLLC

(57) ABSTRACT

An apparatus for a vehicle includes a roof box for fitting to a roof of the vehicle with a length of the roof box oriented parallel with a length of the vehicle, and a back box for fitting to a rear of the vehicle with a height of the back box oriented parallel with a height of the vehicle. The roof box and the back box abut one another along a connection interface that extends rearwardly and upwardly from a bottom of the roof box.

19 Claims, 13 Drawing Sheets

(56) References Cited

U.S. PATENT DOCUMENTS

| | | | |
|---|---|---|---|
| 5,110,024 A * | 5/1992 | Rodic ........................ | B60P 3/32 |
| | | | 224/328 |
| 2018/0079348 A1* | 3/2018 | Ronsen ..................... | B60P 3/34 |
| 2023/0032972 A1* | 2/2023 | Neesham ................ | B60R 9/055 |

OTHER PUBLICATIONS

Search Report for corresponding Great Britain Application No. GB2018147.5 dated May 5, 2021.

* cited by examiner

APPARATUS FOR A VEHICLE

FIELD OF THE INVENTION

The present invention relates to an apparatus for a vehicle, the apparatus comprising a roof box for fitting to a roof of the vehicle and a back box for fitting to a rear of the vehicle.

BACKGROUND OF THE INVENTION

There has long been a desire to retrofit vehicles with additional carrying capacity, and various devices such as roof boxes and back boxes are known in the art to provide this extra capacity. Roof boxes are also sometimes used to provide a convenient sleeping place for the occupants of the vehicle.

For example, GB 2,177,979 discloses a supporting body with a storage section attached to the back of a vehicle, and an L-shaped structure which is slidably attachable to the roof of the vehicle and the supporting body. This provides sleeping and living areas. However, the L-shaped supporting body is bulky and difficult to store when not in use.

Another problem with known roof and back boxes is that they are typically aerodynamically inefficient and significantly increase fuel consumption at higher vehicle speeds.

It is therefore an aim of the invention to provide a more compact and efficient apparatus for increasing the capacity of a vehicle.

SUMMARY OF THE INVENTION

According to a first aspect of the invention, there is provided an apparatus for a vehicle, the apparatus comprising a roof box for fitting to a roof of the vehicle with a length of the roof box orientated parallel with a length of the vehicle, and a back box for fitting to a rear of the vehicle with a height of the back box orientated parallel with a height of the vehicle.

The roof box and the back box may connect along a connection interface that extends rearwardly and upwardly from a bottom of the roof box. The vehicle may for example be a car or a van, and the apparatus may be particularly suitable for use with relatively tall vehicles such as 4×4's, SUV's and monospace vehicles such as people carriers.

The rearward and upward extension of the connection interface provides a balance between two conflicting requirements, that the roof box should be as long as possible to provide sufficient length for a person to sleep in, and that the back box should be as high as possible to maximise the headroom for a person entering inside the back box. Both these objectives are achieved by the rearward and upward extension of the connection interface, without needing to make the overall combination of the roof box and back box excessively long or excessive high. Rearwardly and upwardly is the same as upwardly and rearwardly; there is no order implied by the order in which the terms are written.

The connection interface may follow a U shaped path between the roof box and the back box. For example, the connection interface may extend upwardly and rearwardly along both the left and rear sides of the roof box and back box, and sidewards from the left side to the right side of the roof box and back box. The sidewards extension of the connection interface may be substantially horizontal.

The connection interface also allows the roof box and the back box to be separated from one another when not in use, and may ease the installation of the roof box and the back box onto the vehicle. The connection interface may even allow one of the roof box and back box to be fitted to the vehicle and used when the other of the roof box and back box is stored away remotely from the vehicle. Accordingly, the roof box and the rear box may be repeatedly removable and attachable to one another at the connection interface, for example using over-centre clamps or latches.

The apparatus may further comprise one or more blanking plates for fitting over the connection interface when only one of the roof box and back box are fitted to the vehicle. A blanking plate for the back box may be mounted to the back box with extendable arms, which allow the height of the blanking plate to be raised and lowered relative to the back box. A blanking plate for the roof box may comprise a hatch which is openable to allow a user to enter the roof box, for example to provide access to storage space or for sleeping in the roof box.

The apparatus may also comprise one or more stabiliser bars configured to connect from roof bars, roof rails or roof bar mounting points of the vehicle, to the back box. The stabiliser bars may resist side-to-side movement of the back box, and therefore stabilise the back box when the roof box is absent and the vehicle is in motion. Each stabiliser bar may be configured to connect from roof bars, roof rails, or roof bar mounting points at one side of the vehicle, to an upper portion of the back box, for example the top of the back box. Each stabilise bar may connect to the back box at the front panel of the back box.

The rearward and upward extension of the connection interface may take various forms whilst still achieving a longer roof box than if the roof box was simply mounted fully in front of the back box, and a higher back box than if the back box was simply mounted fully beneath the roof box. For example, the connection interface may comprise one or more steps defined by alternate rearwardly and upwardly extending portions of the connection interface. For example, the steps may be defined by alternate vertically and horizontally extending portions of the connection interface. The rearward and upward extension of the connection interface may also, or alternatively, comprise a sloping connection interface that is non-orthogonal to the length of the roof box and the height of the back box. The sloping connection interface therefore gradually increases in height as it extends rearwardly.

In a preferred embodiment, the connection interface comprises a portion that extends only upwardly from the bottom of the roof box. This portion provides a substantially vertical edge or face that allows the roof box to be slid rearwardly and come to a positive stop against the back box, without any tendency for the roof box to continue further rearward by camming upwardly. For example, the connection interface may comprise a first portion that extends only upwardly from the bottom of the roof box and a second portion that extends from the first portion rearwardly and optionally upwardly.

The roof box preferably comprises a base portion and a top portion that is configured to open up from the base portion. Then, the top portion can be opened upward to provide more vertical space inside of the roof box. The base portion and the top portion may be connected by an expandable intermediate portion that is configured to expand as the top portion is opened up from the bottom portion, for example to maintain an enclosed space inside the roof box.

The base portion of the roof box may extend further forward than the top portion of the roof box, and the top portion of the roof box may extend further rearward than the base portion of the roof box. This enables both the base portion and the top portion when taken individually to be shorter than the full length of the roof box, and so makes the roof box more compact for shipping before assembly of the base portion and the top portion to one another.

The connection interface may extend along the base portion and not the top portion, for example the top portion may not extend further rearwardly than the base portion, or if the top portion does extend further rearwardly than the base portion, then the top portion may extend further rearwardly than the rear of the back box. However, the connection interface preferably extends along both the base portion and the top portion. For example, the connection interface may extend from an abutment of the base portion of the roof box with the front of the back box to an abutment of the top portion of the roof box with the rear of the back box.

In the case of a sloping connection interface, at least part or all of the sloping connection interface at the roof box may be defined by a sloping rearmost edge or surface of the base portion of the roof box. Preferably, at least part of the sloping connection interface at the roof box may be defined by a sloping rearmost edge or surface of the top portion of the roof box.

In one example, the sloping connection interface at the roof box may be fully defined by the sloping rearmost surface of the top portion of the roof box, and the base of the roof box and the front of the back box may abut one another at an upwardly extending part of the connection interface in a plane parallel to the front of the back box, which is typically substantially vertical.

The roof box comprises a front with a curved or parabolic leading edge extending for at least 10% of the length of the roof box, to reduce the wind resistance offered by the roof box and reduce vehicle fuel consumption. More preferably, the curved or parabolic leading edge extends for at least 25%, at least 50%, or at least 75% of the length of the roof box along the top surface of the roof box.

The back box could be attached to the rear of the vehicle using an arrangement of straps or ties, but is preferably configured to attach to a tow hitch of the vehicle. The tow hitch may for example be a ball hitch, as commonly fitted to vehicles.

The back box may comprise a mounting bracket for attaching to the tow hitch, wherein the mounting bracket is height adjustable to raise and lower a height of the back box relative to the vehicle. The adjustability allows the back box to be raised and lowered to the required height to connect with the roof box at the connection interface, and so allows the roof box and back box to be mounted to vehicles having differing heights between their tow hitch and roof bars.

The mounting bracket is preferably configured to hold and support all of the weight of the back box upon the tow hitch. Then the back box does not require any supplementary wheels to support the back box whilst the vehicle is driving along a road.

One of the drawbacks of mounting back boxes to the rears of vehicles is that the back boxes often block the vehicle driver's view of the road behind the vehicle in the interior mirror on the front windscreen. Therefore, the front of the back box preferably comprises a front window formed of a transparent material and the rear of the back box preferably comprises a rear window formed of a transparent material, wherein the front window and the rear window are both in alignment with one another and are configured to align with a central region of a rear windscreen of the vehicle. This allows the driver of the vehicle to still see behind the vehicle and back box in the interior mirror.

The front of the back box may be substantially vertical, perpendicular to the bottom of the roof box, and so for vehicles having a rear that slopes both rearwardly as well as downwardly, the gap between the top rear of the vehicle and the front of the back box can be fairly large. Advantageously, the apparatus may further comprise a plurality of wind deflectors configured to mount to the back box and to extend forwardly from the back box towards the vehicle, each wind deflector having a leading edge that follows the shape of the vehicle, substantially filling the gap extending from the back box to the vehicle. This increases the aerodynamic efficiency of the back box since air smoothly flows from the sides of the vehicle and along the back box without creating a large region of turbulence in an empty gap between the back box and the rear of the vehicle.

The wind deflectors preferably also mount to the roof box to provide additional stiffness and to fill a gap between the upper rear of the vehicle and the roof box. Each wind deflector may comprise a rear interface for mounting to the back box and a roof interface for mounting to the roof box, wherein the rear interface and roof interface extend perpendicular to one another. The wind deflectors may comprise a wind deflection surface that substantially fills a gap between the rear interface, roof interface, and vehicle. The wind deflectors may comprise wind deflectors of different sizes to one another for use with vehicles of different sizes to one another. Accordingly, the wind deflectors adapt the roof box and the back box for aerodynamically efficient use with a variety of differently sized vehicles.

Whether or not wind deflectors are provided, the apparatus may further comprise one or more additional storage box(es) that mount in front of the back box, against a front panel of the back box, and are assessable through door(s) in the front panel. The additional storage boxes may be added if the particular vehicle the apparatus is to be mounted to has a sloping rear end and so provides sufficient space for the additional storage box(es) to be mounted. Preferably, there are two of the additional storage boxes, one on each side on the front window.

The back box may comprise a rear door that is configured to hinge upwardly about hinges provided along a top rear edge of the back box. Then, the rear door when swung up to a substantially horizontal position can form a roof or shelter for people beneath it. In some example, fabric sheets may be provided to create an enclosed space beneath the substantially horizontal rear door, similar to a tent. The rear door may be supported in the horizontal position by gas struts, extendible legs, or the like. Preferably, the rear door comprises an access door in a panel of the rear door, the access door being hinged to the panel of the rear door. The hinges connecting the panel to the access door preferably have a vertical hinge axis, perpendicular to the hinge axis of the hinges connecting the rear door to the top rear edge of the back box.

The roof box is preferably fitted to the roof of the vehicle by the bottom of the roof box connecting to roof bars, roof rails, or roof bar mounting points of the vehicle. Many vehicles are equipped or can be equipped with roof bars or roof rails, as is known in the art. The bottom of the roof box may comprise sliders configured to attach the bottom of the roof box to roof bars or roof rails of the vehicle, and the sliders may be configured to slide along the roof bars or roof rails, allowing the roof box to slide rearwardly relative to the vehicle. The roof bars or roof rails may form part of the apparatus if the vehicle does not already have suitable roof bars or roof rails. One advantage of this arrangement is that the sliders supporting the roof box can be slid in a horizontal direction along the bars or rails until the roof box correctly mates with the back box at the connection interface.

Together with the height adjustable mounting bracket of the back box, this allows the roof box and back box to be fitted to a very large variety of differently shaped vehicles.

Another advantage of allowing the roof box to slide rearwardly relative to the roof bars is that the back box may be made detachable from the vehicle and provided with retractable or removable legs configured to support the back box above ground. The legs may be extended or attached, the back box detached from the tow hitch, and then the vehicle driven forwardly to create an open space behind the vehicle and underneath the roof box as the roof box slides rearwardly relative to the vehicle. This provides access to the boot of the vehicle, and the open space may be used as a sheltered area for people to stand in. Therefore, the apparatus may further comprise one or more fabric sheets configured to attach between the back box and the roof box once the back box and roof box have been slid rearwardly relative to the roof bars and the vehicle, thereby forming a tent-like region behind the vehicle.

The back box may comprise an interior having steps or a ladder leading to an upper opening in the back box, through which an interior of the roof box is accessible. Then a person entering the back box, for example through the rear door of the back box, is able to climb up the steps and/or ladder into the roof box to access the sleeping area.

The back box may have a substantially cuboid shape, for example with substantially rectangular front, rear, side, top and bottom surfaces. The front and rear surfaces may be substantially parallel to one another, and the side surfaces may be substantially parallel to one another. The bottom surface may be orthogonal to the front, rear, and side surfaces, and the top surface may be parallel to the bottom surface, or may slope or step upwardly towards the rear.

DETAILED DESCRIPTION

Embodiments of the invention will now be described by way of non-limiting example only and with reference to the accompanying drawings, in which:

FIG. 4b shows an exploded schematic diagram of the mounting bracket of FIG. 4a;

The figures are not to scale, and same or similar reference signs denote same or similar features.

Figure 1:
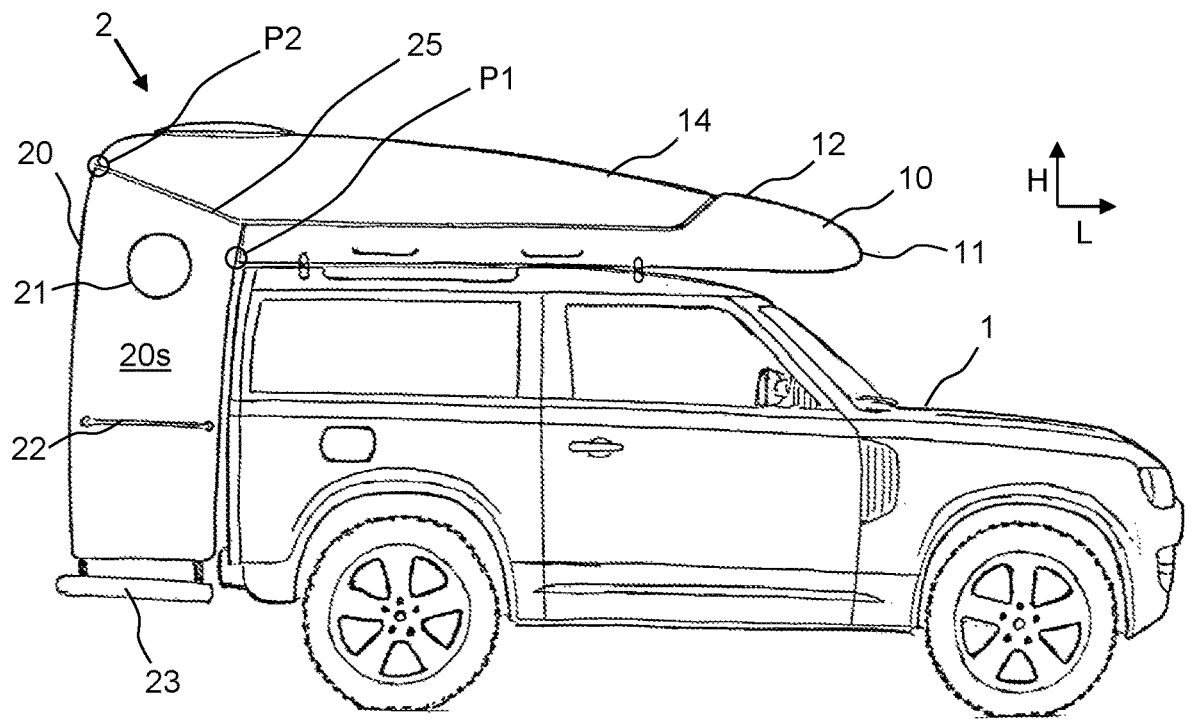
FIG. 1 shows a schematic side elevation of an apparatus according to an embodiment of the invention fitted to a vehicle.

The schematic diagram of FIG. 1 shows an apparatus 2 in accordance with an embodiment of the invention, fitted to a vehicle 1. The apparatus comprises a roof box 10 that is fitted on the roof the vehicle and has a length aligned with the length of the vehicle, and a back box 20 that is fitted to the rear of the vehicle and has a height aligned with the height of the vehicle. The height and length directions are illustrated on the axes H and L, respectively. The L direction typically corresponds to the horizontal direction the vehicle is driven forwardly in, and the H direction typically corresponds to a vertically upward direction, perpendicular to the L direction. The roof box 10 may comprise a curved or parabolic front portion 11 for aerodynamic efficiency, which extends for around 75% of the overall length of the roof box.

The roof box may comprise a base portion 12 and a top portion 14 that is configured to open up from the base portion 12 (see FIG. 7), for example to provide additional storage space or room for one or more persons to sleep inside the roof box. The base portion 12 of the roof box extends further forward than the top portion 14 of the roof box, and the top portion 14 of the roof box extends further rearward than the base portion 12 of the roof box.

The back box may comprise a side panel 20s having a transparent window 21 and a handle 22, the window 21 for allowing light into the back box and the handle 22 for assisting a user in moving the back box on/off the vehicle.

Figure 2:
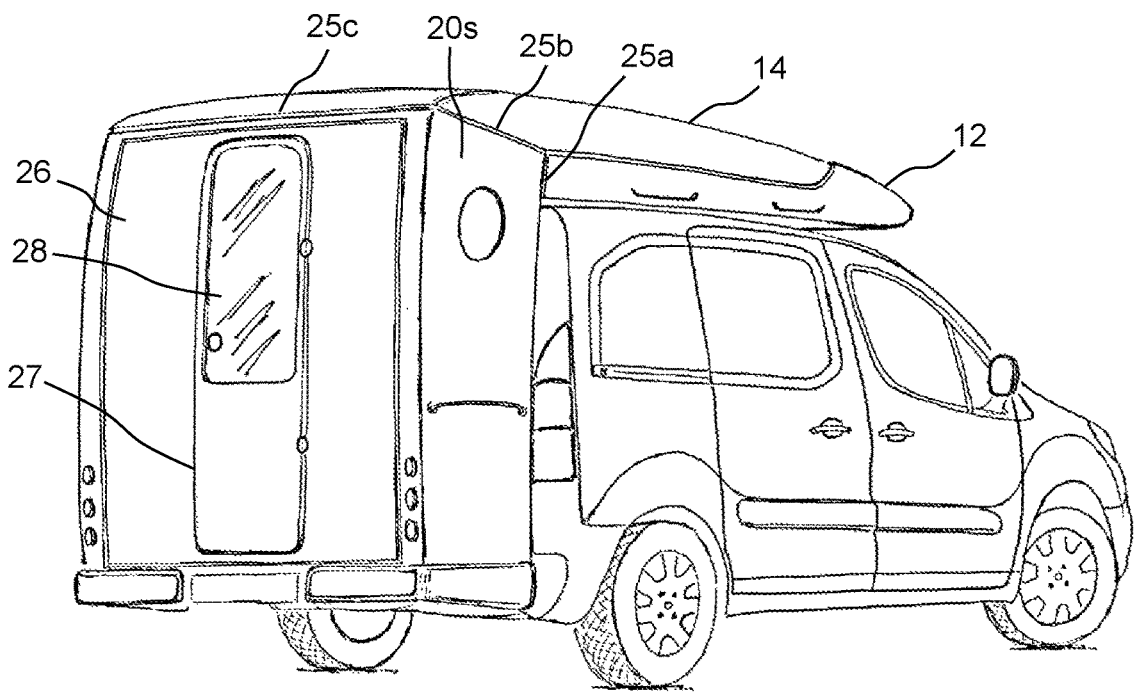
FIG. 2 shows a schematic perspective diagram of the apparatus of FIG. 1.
Figure 19:
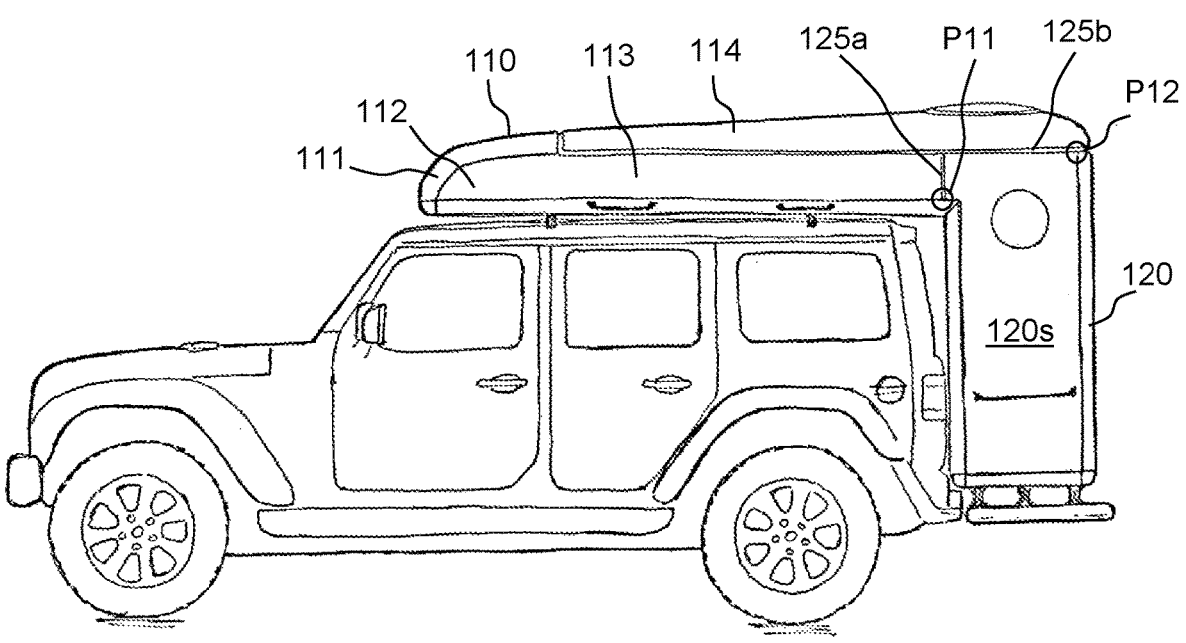
FIG. 19 shows a schematic side elevation of an apparatus according to an alternative embodiment of the invention fitted to a vehicle.
Figure 20:
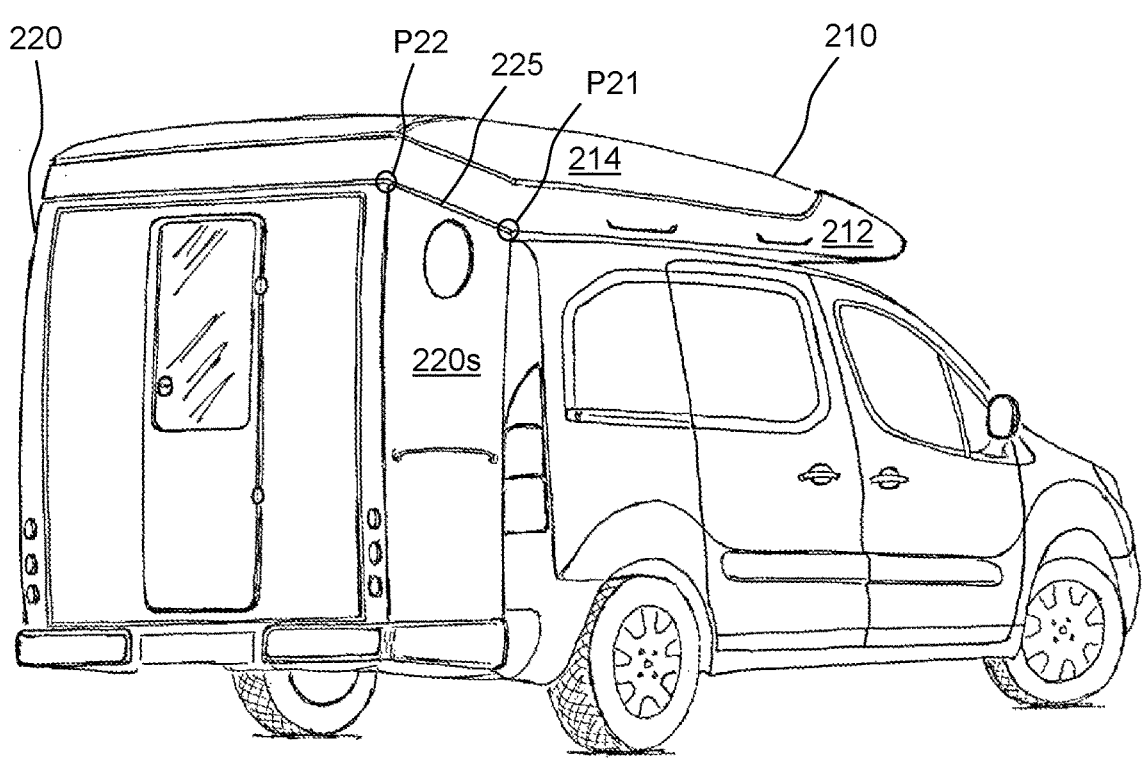
FIG. 20 shows a schematic perspective diagram of an apparatus according to a further alternative embodiment of the invention fitted to a vehicle.

The roof box and the back box abut one another along a connection interface 25, which may extend upwardly and rearwardly from a bottom of the roof box 10 at point P1, to a point P2 at the top rear of the back box. Referring to FIG. 2, the connection interface 25 has a stepped formation comprising a first portion 25a that extends upwardly from the bottom of the base portion 12, and a second portion 25b that extends rearwardly and upwardly from the first portion 25a, to the top rear of the back box. The second portion 25b extends in a sloped direction, which is non-orthogonal to the length L and the height H. However, the connection interface could be formed of horizontal/vertical steps 125a and 125b, as shown in FIG. 19, or a single sloping portion, as shown in FIG. 20.

Referring to FIG. 2, the connection interface also comprises a third portion 25c, which is substantially horizontal, and extends across the width of the back box, parallel to the width of the vehicle. The connection interface continues along the other side of the apparatus from that visible in FIG. 2, and so is substantially U-shaped. The rear of the back box 20 is visible in FIG. 2, and comprises a rear door 26 which is upwardly openable about hinges aligned horizontally across the top of the back box (see FIG. 7). The rear door 26 comprises an access door 27 which is openable from the rear door 26 about a vertical hinge axis, and the access door comprise a rear window 28 that may be formed of glass or a transparent plastics material.

Figure 3:
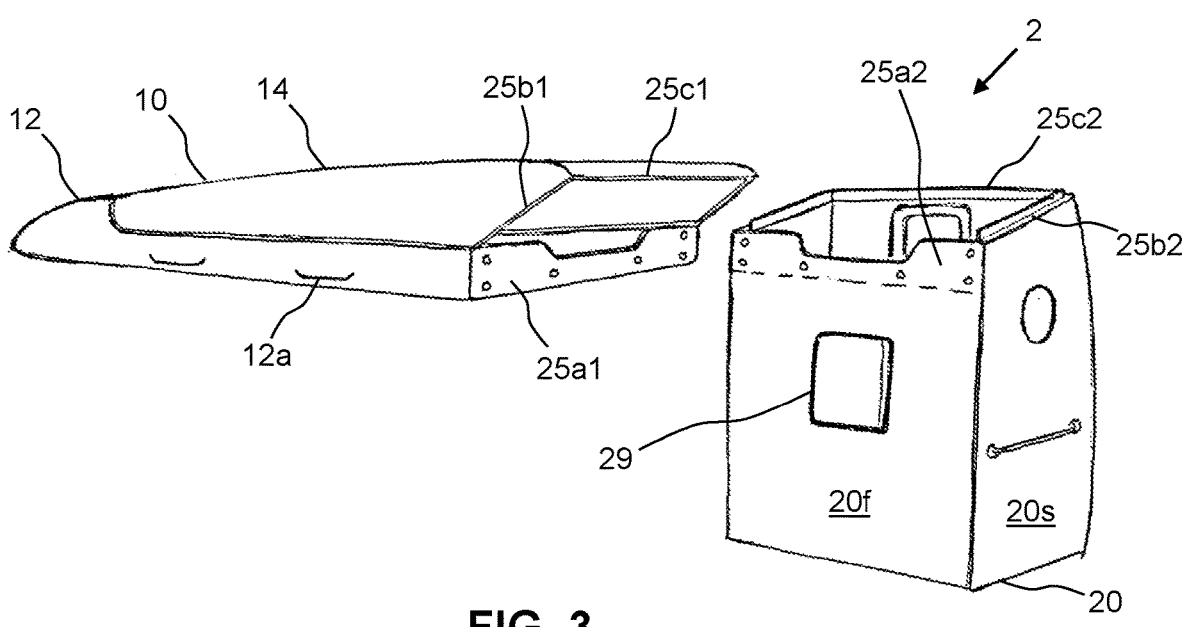
FIG. 3 shows an exploded schematic diagram of the apparatus of FIG. 1 when separated from the vehicle, including a roof box and a back box.

The schematic diagram of FIG. 3 shows the roof box 10 and back box 20 in a state where they have been removed from the vehicle and disconnected from one another. The roof box comprises four handles 12a to assist a user in moving the roof box and installing it upon the vehicle. The back box may have a rectangular shape, with the side panels 20s facing one another and the rear door 26 and a front panel 20f facing one another, substantially perpendicular to the side panels 20s.

The front panel 20f may comprise a window 29 formed of glass or transparent plastics material, and the window 29 may be aligned with the window 28 (see FIG. 2) so that a driver of the vehicle is able to see straight through the back box and behind the vehicle and apparatus using the interior mirror mounted on the front windscreen of the vehicle.

The connection interface 25 comprises two faces 25a1 and 25a2 that abut against one another to form the first portion 25a, two edges 25b1 and 25b2 that abut against each other to form the second portion 25b, and two edges 25c1 and 25c2 that abut against each other to form the third portion 25c. The roof box and the back box may for example be secured together by bolts extending through the faces 25a1 and 25a2 or by quick release fasteners, and/or by clips extending between the edges 25b1 and 25b2, and between the edges 25c1 and 25c2. Accordingly, the roof box 10 and the back box 20 can be connected and disconnected from one another whenever desired.

Figure 4A:
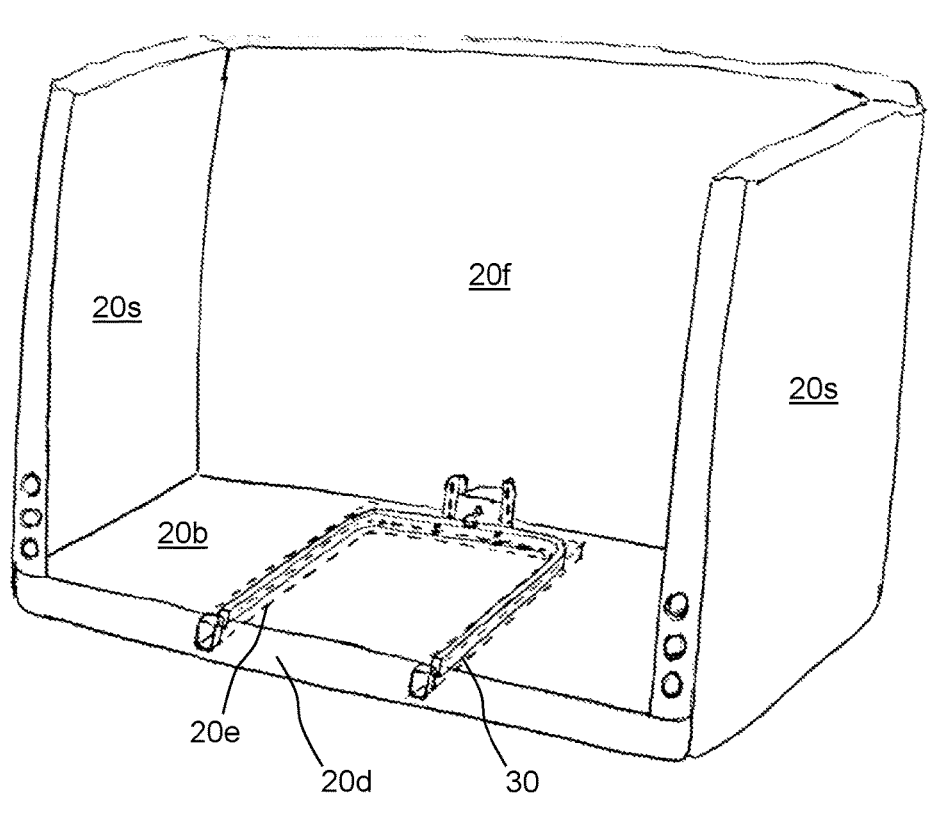
FIG. 4a shows a schematic diagram of a portion of the back box of FIG. 3 with a mounting bracket for connecting the back box to the vehicle.
Figure 4B:
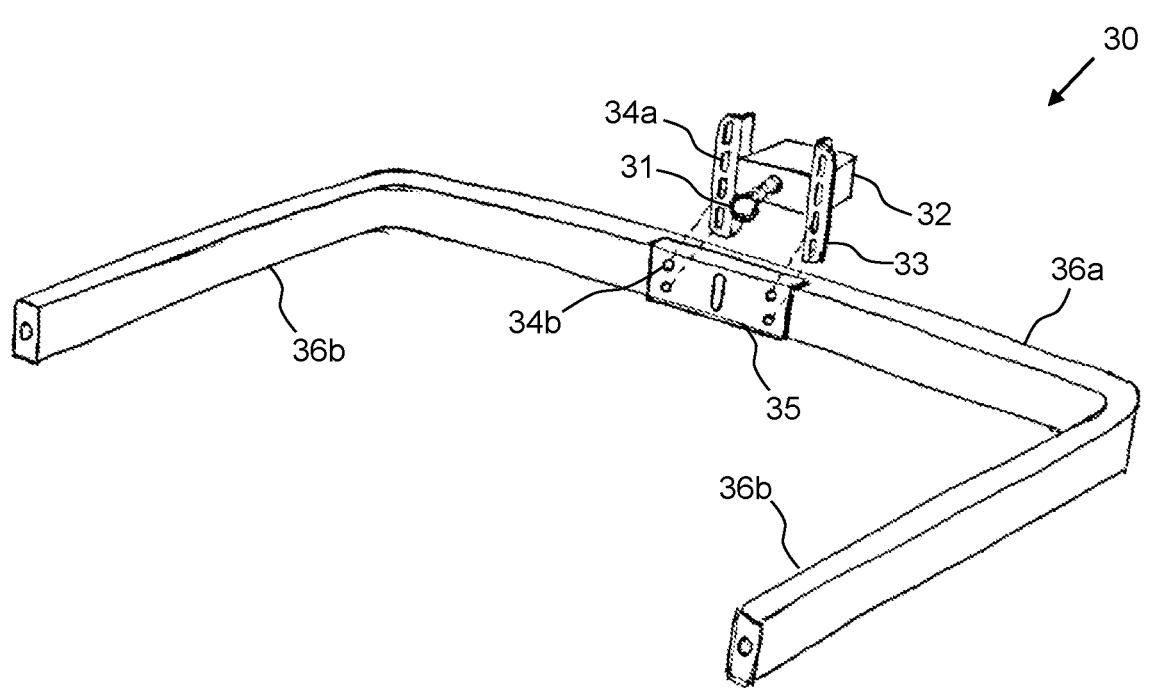
Figure 4C:
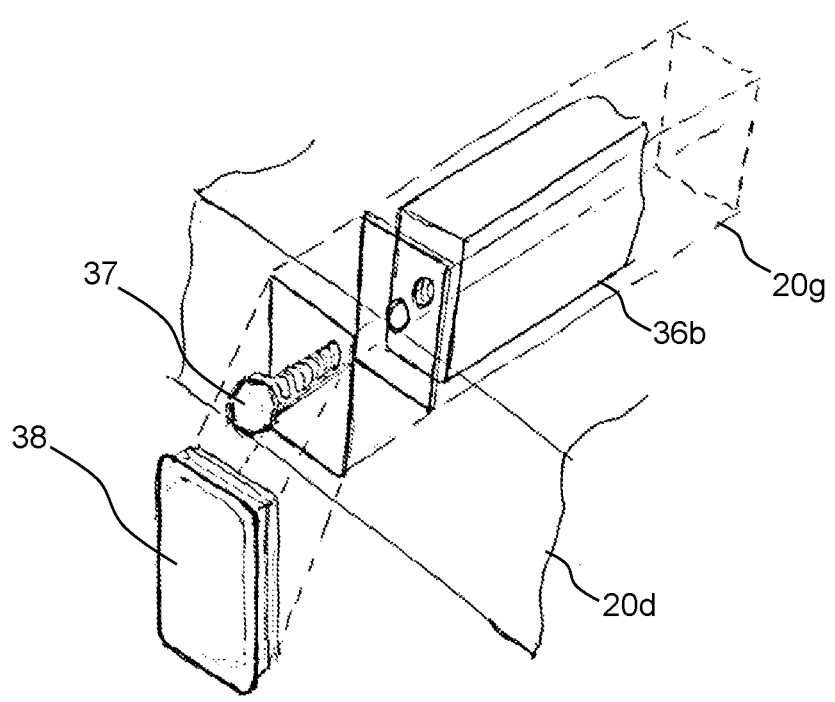
FIG. 4c shows an enlarged schematic diagram of an end of the mounting bracket of FIG. 4a when fitted to the vehicle.

The back box 20 may be connected to a rear tow hitch of the vehicle, for example as shown in FIGS. 4a to 4c. The back box may comprise a base panel 20b adjoining the side panels 20s and the front panel 20f, and the base panel 20b may comprise two sleeves 20e for receiving two respective arms 36b of a mounting bracket 30. The mounting bracket 30 is shown separately form the back box in FIG. 4b, and comprises a tow hitch connector 32, vertically extending mounting plates 33, horizontally extending mounting plate 35, and a U-shaped member comprising arms 36b extending perpendicular from a base 36a.

The two vertically extending mounting plates 33 are fixed at opposing sides of the tow hitch connector 32, and each has four holes 34a for aligning with corresponding holes 34b of the horizontal mounting plate 35, allowing the horizontal mounting plate 35 to be bolted to the vertically extending mounting plates 33. The horizontal mounting plate 35 is fixed to the base 36a of the U-shaped member. The height that the horizontal mounting plate 35 is held at can be varied by aligning the holes 34b with different ones of the holes 34a, thereby altering the height of the U-shaped member and therefore the height of the back box 20 relative to the tow hitch of the vehicle. Therefore, the back box can be set at a height so that its top correctly abuts with the roof box.

In one example shown in FIG. 4c, the arms 36b are secured in the sleeves 20e of the back box by a bolt 37 that passes through the lower edge 20d of the back box and into the ends of the arms 36b, A cover plate 38 fits into the lower edge 20d, over the head of the bolt 37.

Figure 5:
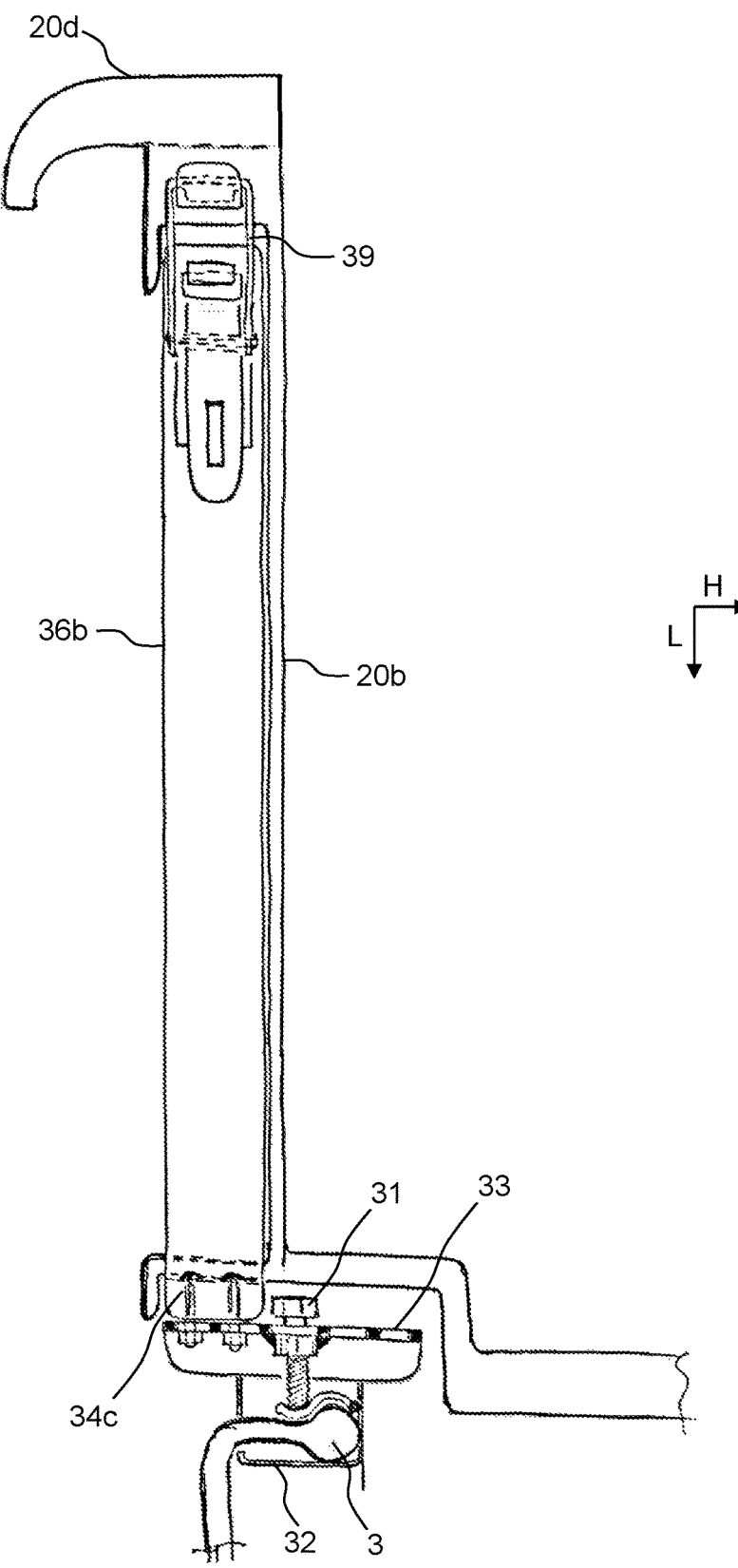
FIG. 5 shows a cross-sectional diagram of an alternative mounting bracket.

In another example shown in FIG. 5, the arms 36b are secured in the sleeves by over-centre clips 39. In this case, the sleeves do not fully surround the arms 36b, and are formed by ribs or protrusions on the base panel 20b that restrain the base panel from moving relative to the arms 36b. The tow hitch 3 of the vehicle can also be seen in FIG. 5, along with the bolt 31 that is tightened to clamp the tow hitch connector 32 to the tow hitch 3, as will be apparent to those skilled in the art. FIG. 5 also shows bolts 34c that extend through the holes 34a and 34b (see FIG. 4b) in order to set the height of the U-shaped member relative to the tow hitch 3. The example of FIG. 5 has the advantage that the back box may be more easily connected and disconnected from the arms 36b of the U-shaped member using the over-centre clips 39, than using the bolts 37 shown in the example of FIG. 4c. In both examples, the full weight of the back box is supported by the tow hitch 3 of the vehicle.

Figure 6A:
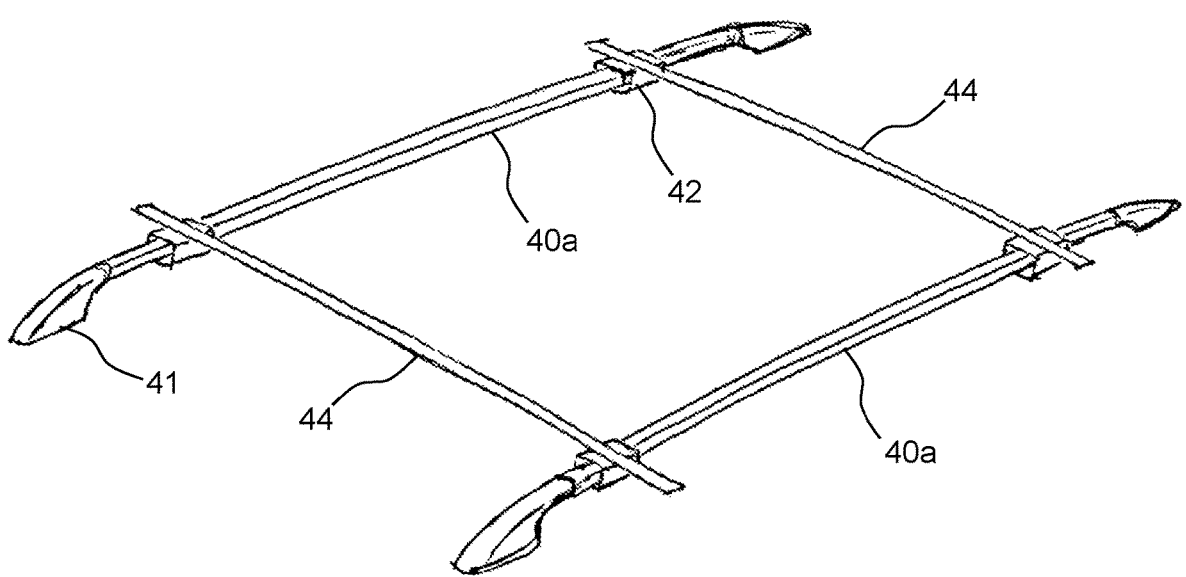
FIG. 6a shows a schematic perspective diagram of rails and sliders for attaching the roof box to the vehicle.

The schematic diagram of FIG. 6a shows one way in which the roof box 10 may be mounted to the top of the vehicle. In this example, the vehicle is fitted with roof bars 40a which extend longitudinally along the roof of the vehicle. The roof bars 40a are anchored to the roof of the vehicle by roof bar feet 41. The apparatus comprises sliders 42 and two crossbars 44 which each connect a pair of sliders together. The sliders 42 are slidable along the roof bars 40a. The crossbars 44 are attached to the bottom of the base portion 12 of the roof box, and so the roof box can be slid in a direction parallel to the roof bars 40a by sliding the sliders 42 along the roof bars. The sliders 42 are preferably fitted with clips that allow the sliders to be locked in position on the roof bars 40a, to prevent unintentional movement of the roof box 10.

Figure 6B:
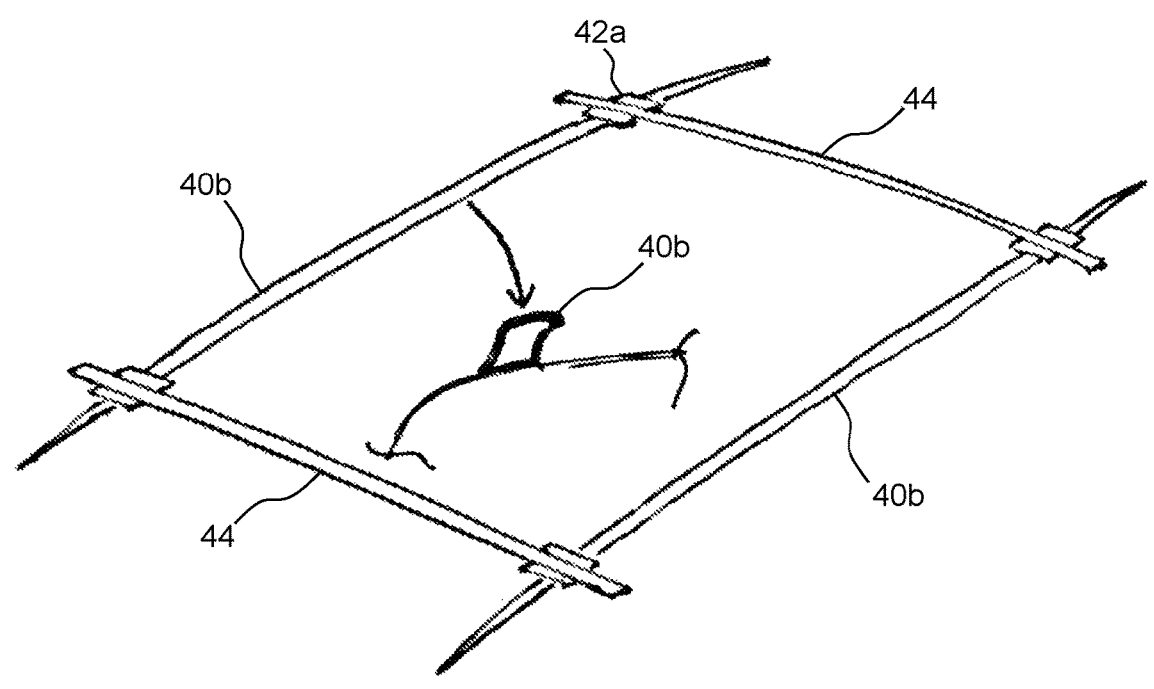
FIG. 6b shows a schematic perspective diagram of alternative rails and sliders for attaching the roof box to the vehicle.

Another way in which the roof box 10 can be mounted to the roof of the vehicle is shown in FIG. 6b. In this example, the vehicle does not have any roof bars, but instead has roof rails 40b that extend directly from the roof of the vehicle instead of being connected by roof bar feet 41. There are four sliders 42a, similar to the sliders 40 but adapted to slide along the roof rails 40b rather than the roof rails 40a.

Figure 7:
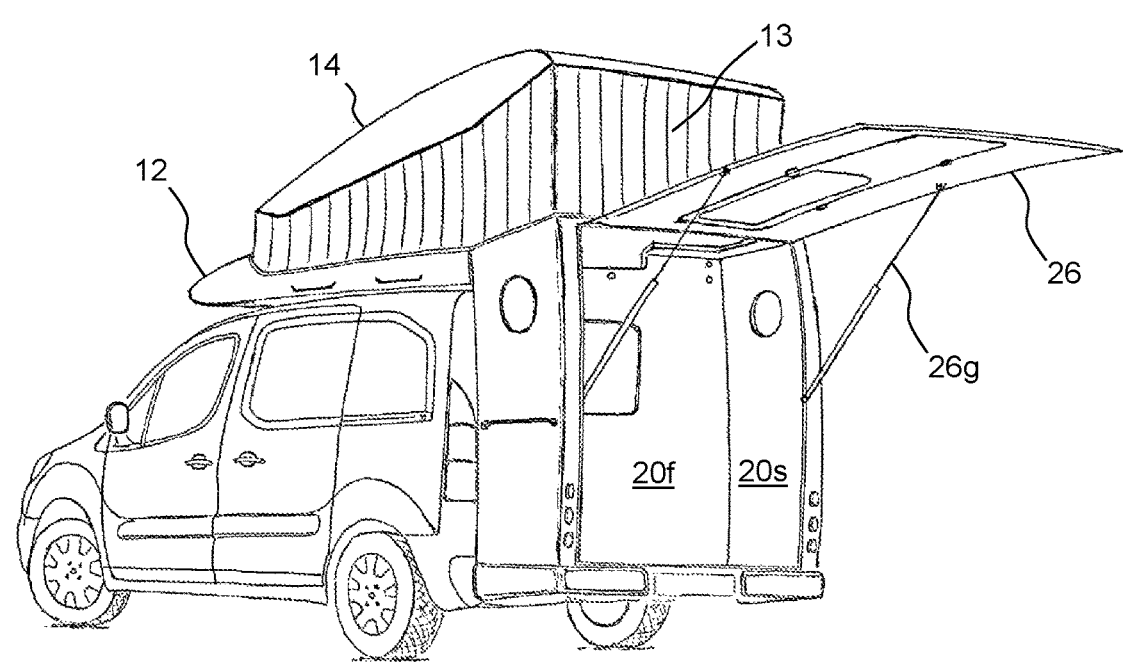
FIG. 7 shows a schematic perspective diagram of the apparatus of FIG. 1 in an expanded configuration.

The schematic diagram of FIG. 7 shows how the apparatus can be expanded in use. In particular, the top portion 14 of the roof box can be opened upwardly from the base portion 12 to increase the capacity of the roof box, with an expandable intermediate portion 13 connecting the base portion 12 to the top portion 14. The expandable intermediate portion 13 is typically a woven or non-woven fabric material connected to the base and top portions. The rear door 26 has also been opened upwardly, with the assistance of gas struts 26g that support the weight of the rear door and hold it in the open position.

Figure 8:
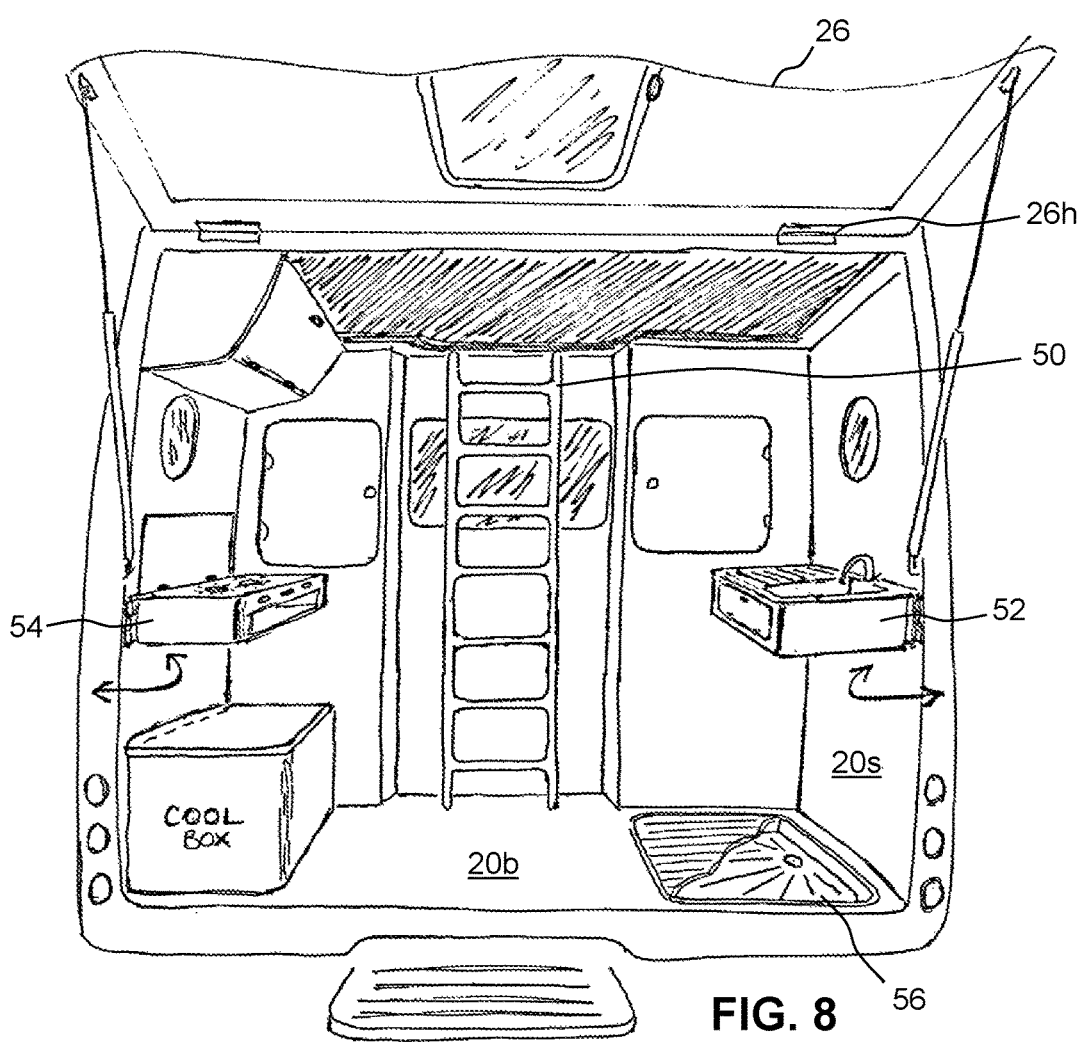
FIG. 8 shows a schematic view of one possible inner configuration of the back box of FIG. 3.

The schematic diagram of FIG. 8 shows one example of how the inside of the back box 20 may be configured. In this example, the back box 20 comprises a ladder 50, a sink 52 and cooker 54, along with various storage boxes and/or cupboards. The sink 52 and the cooker 54 are mounted to the side panels 20s of the back box with hinges, which allow the sink and cooker to be swung outwardly from the back box as shown by the arrows once the rear door 26 has been raised. The hinges 26h that the rear door 26 is hinged upwardly about are also visible in FIG. 8, as is a shower tray 56 on the base panel 20b of the back box. The ladder 50 enables a user inside of the back box to climb upwardly from the back box 20 and into a sleeping compartment inside the roof box 10.

Figure 9:
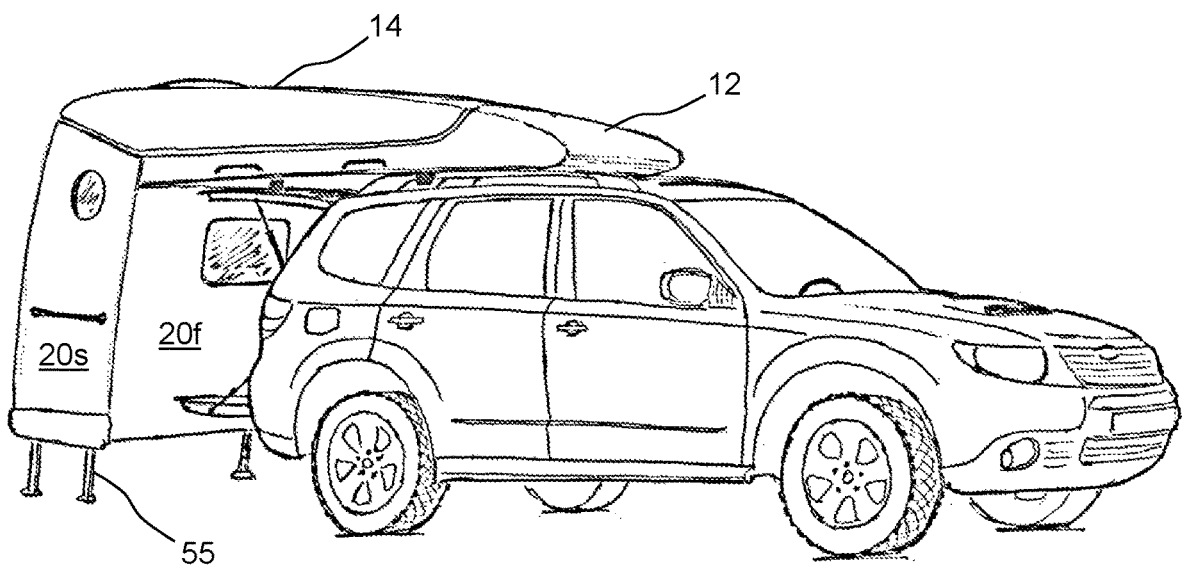
FIG. 9 shows a schematic perspective diagram of the apparatus of FIG. 1 when it has been slid rearwardly relative to the vehicle.

FIG. 9 shows a schematic diagram of the apparatus when the back box has been released from the tow hitch 3 and the roof box slid rearwardly along the roof bars/roof rails of the vehicle. The weight of the back box is supported by legs 55 which are attachable to the base panel of the back box. This provides space for the user to access the boot of the vehicle, as shown.

Figure 10:
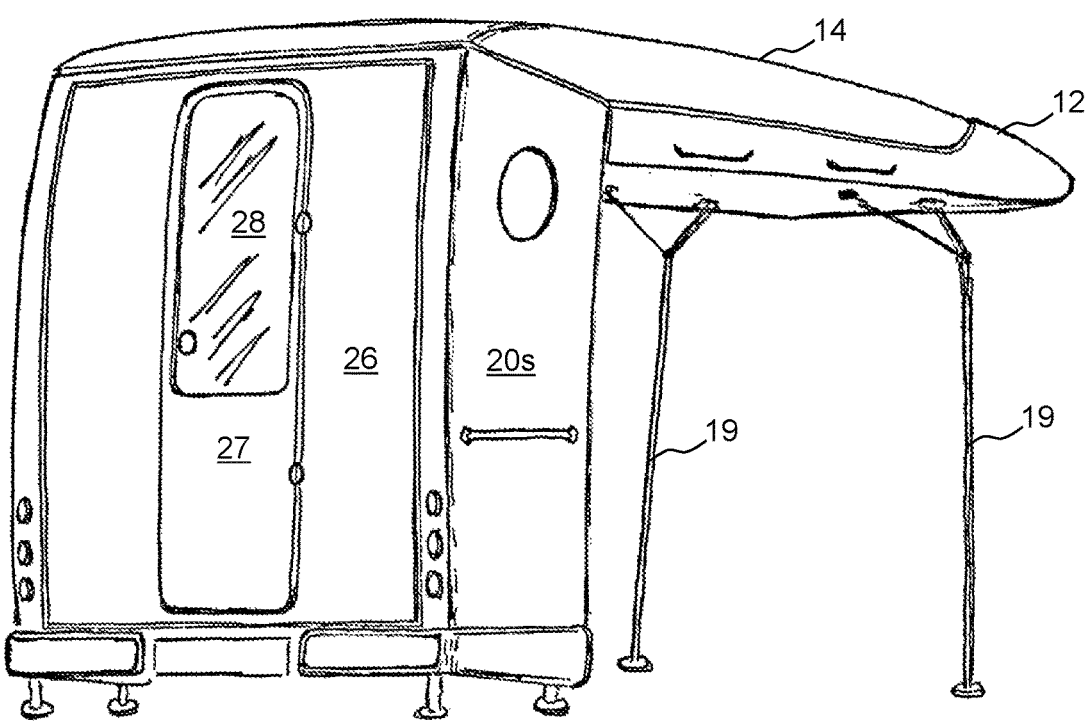
FIG. 10 shows a schematic perspective diagram of the apparatus of FIG. 1 when the vehicle has been driven away from the apparatus.

FIG. 10 shows a schematic diagram of the apparatus in a state where the vehicle has been driven away completely, with additional legs 19 attached to the roof box to support the weight of the roof box. The space beneath the roof box forms a canopy for people to stand underneath, and the apparatus may further comprise woven or non-woven fabric sheets for attaching around the roof box and the legs 19 to form a tent.

Figure 11:
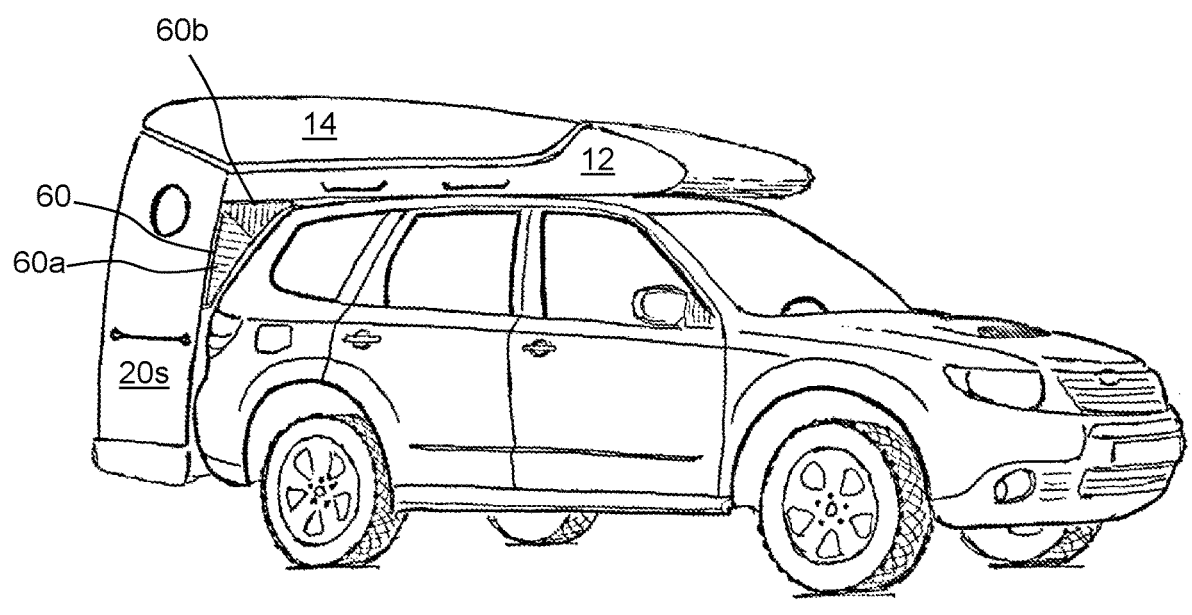
FIG. 11 shows a schematic perspective diagram of the apparatus of FIG. 1, additionally comprising wind deflectors.

The schematic diagram of FIG. 11 shows the apparatus further comprising a wind deflector 60 that is mounted between the rear of the vehicle and the roof and back boxes of the apparatus. The wind deflector improves the aerodynamics of the vehicle and fills in the large gap that would otherwise be present between the rear of the vehicle and the roof and back boxes of the apparatus. There are a wide variety of different shapes and types of wind deflector that could be fitted, to suit the particular vehicle that the apparatus is being fitted to.

The wind deflector fills substantially all of the space in between the rear of the vehicle and the roof and back boxes, to reduce wind turbulence and drag on the vehicle when the vehicle is in motion. The wind deflector may almost, but not quite, touch the rear of the vehicle to prevent rubbing and possible damage to vehicle paintwork or finishing. The wind deflector of FIG. 11 is formed as a single piece, for example of moulded fibreglass, and has different curvatures in the regions 60a and 60b as indicated by the cross-hatching on FIG. 11. The lower region 60a extends forwardly from the back box toward the rear of the vehicle, and the upper region 60b extends downwardly from the roof box toward the rear of the vehicle.

Figure 12:
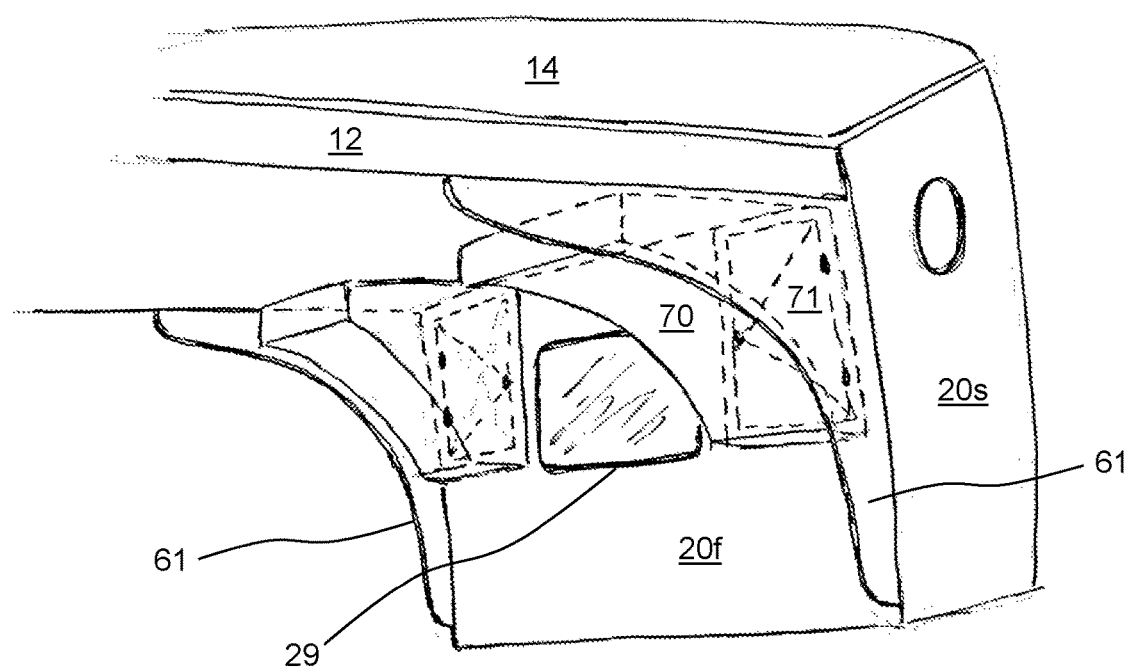
FIG. 12 shows an enlarged schematic perspective diagram of wind deflectors similar to those in FIG. 11.

The schematic diagram of FIG. 12 shows a close-up view of the roof and back boxes with a one-piece wind deflector 61 attached, and without the vehicle for clarity. The wind deflector 61 is mounted to both the base portion 12 of the roof box and the front panel 20f of the back box. Wind deflectors 61 are placed on both sides of the apparatus, as shown. Also shown in FIG. 12 are two additional storage boxes 70 that are mounted between the wind deflectors on the opposite sides of the back box, and in front of the front panel 20f of the back box. The storage boxes 70 may be mounted to both the wind deflectors and the front panel 20f, and make use of space that is present when the apparatus is mounted to vehicles with sloping rear ends. The front panel 20f comprises two doors 71 that provide access to inside the storage boxes 70. Preferably, the storage boxes are mounted on either side of the window 29 in the front panel, to avoid obstructing the view through the front panel.

Figure 13:
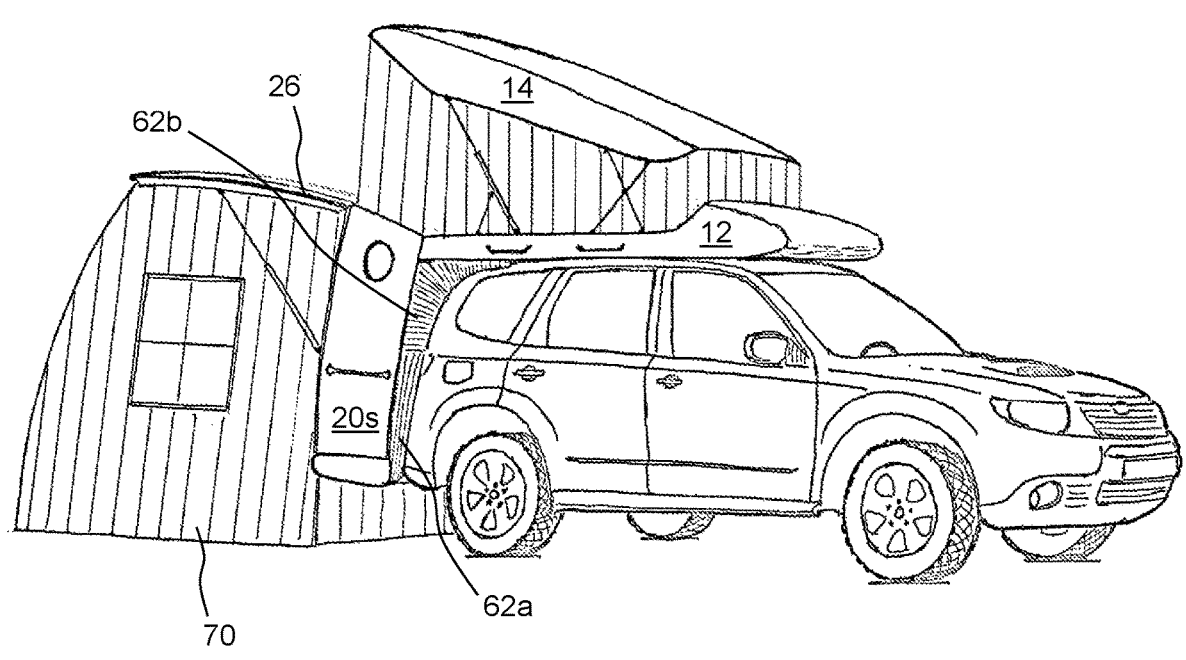
FIG. 13 shows a schematic perspective diagram of the apparatus of FIG. 1, in an expanded state, additionally comprising alternative wind deflectors.

The schematic diagram of FIG. 13 shows the apparatus in an expanded configuration, and with an alternative wind deflector formed of two parts 62a and 62b which are connected to one another, for example using clips. The upper wind deflector 62b is mounted to the roof box and the back box, and may aid in further securing the roof box and the back box to one another. The lower wind deflector 62a is mounted to the front of the back box only. As shown in FIG. 13, the rear door 26 of the back box has been opened upwardly and a fabric material 70 has been attached to the rear door and reaches down to ground level to define a tent-like space beneath the rear door for person(s) to shelter within.

Figure 14:
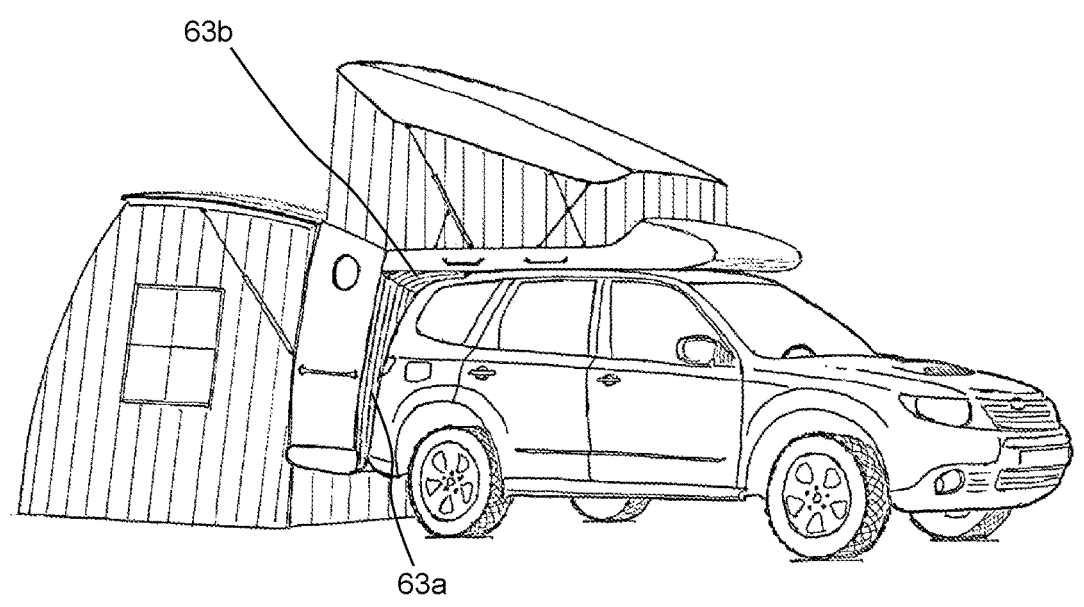
FIG. 14 shows a schematic perspective diagram of the apparatus of FIG. 1, in an expanded state, additionally comprising further alternative wind deflectors.
Figure 15:
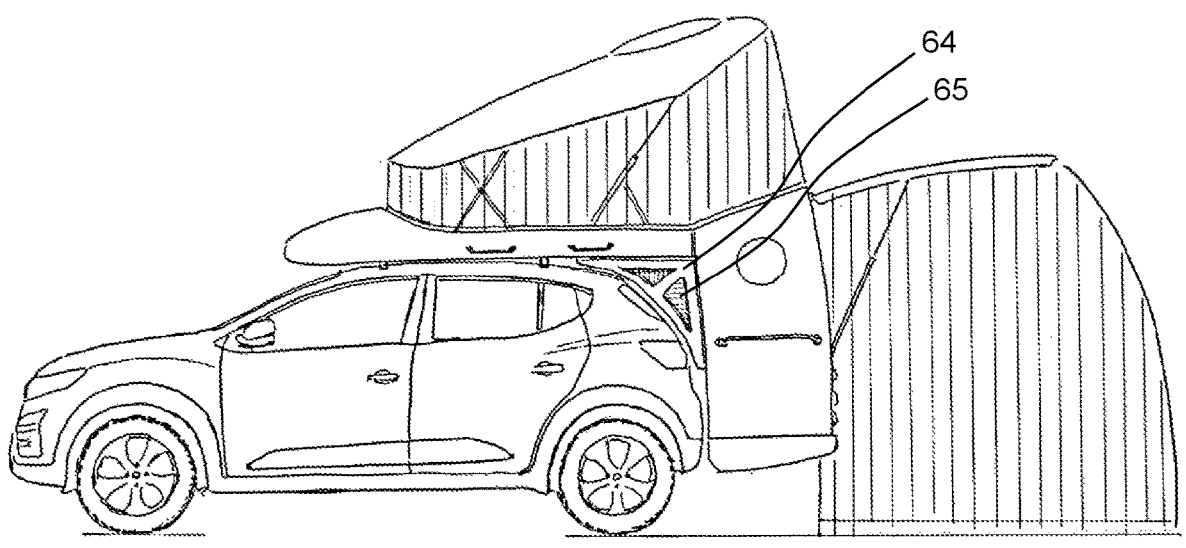
FIG. 15 shows a schematic perspective diagram of the apparatus of FIG. 1, in an expanded state, additionally comprising still further alternative wind deflectors.

FIG. 14 shows yet another possible configuration of the wind deflectors, comprising a lower wind deflector 63a and an upper wind deflector 63b that are connected to one another, the upper wind deflector 63b being mounted to the roof box but not the back box, and the lower wind deflector 63a being mounted to the back box but not the roof box. FIG. 15 shows yet another wind deflector 64, which is formed on one piece, and which has surface textures/decorations 65 for aesthetic effect.

The back box and the roof box may be repeatedly removable and attachable from the vehicle, and from each other, and so they can be added to the vehicle separately from one another depending on the user's requirements. The apparatus may therefore further comprise one or more blanking plates, for connecting at the connection interface of the back box when the roof box is not present, or connecting at the connection interface of the roof box when the back box is not present.

Figure 16:
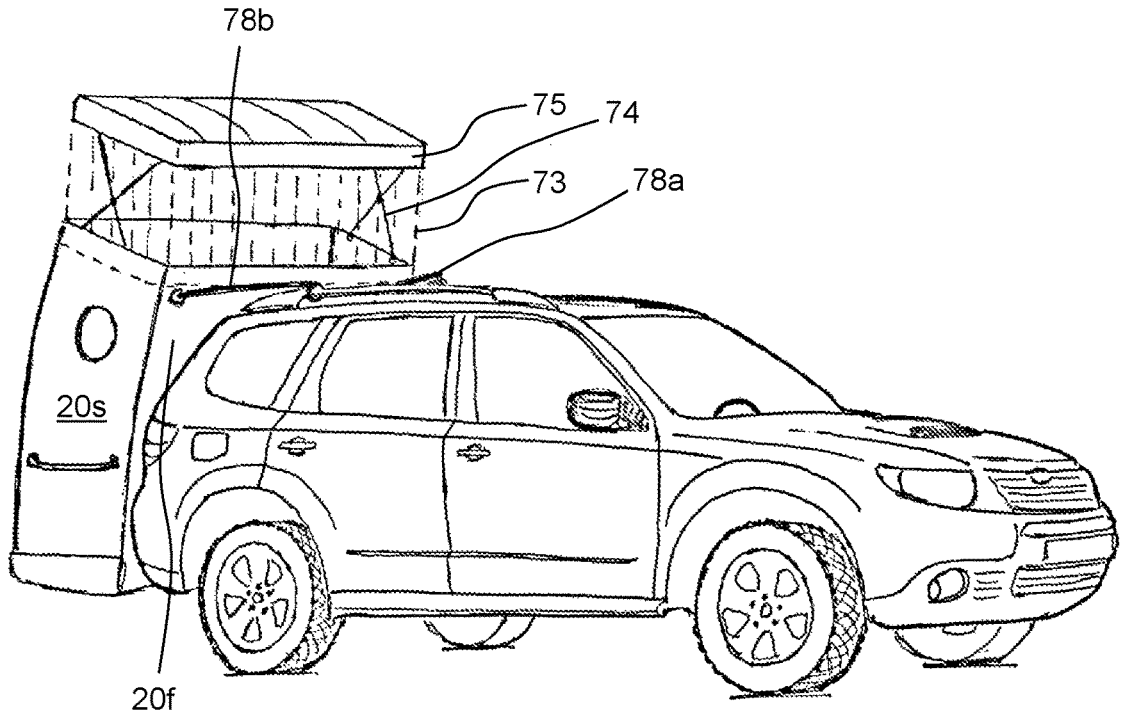
FIG. 16 shows a schematic perspective diagram of the back box of FIG. 3 fitted to a vehicle, additionally comprising a blanking plate for the back box.

For example, FIG. 16 shows the back box mounted to the vehicle without the roof box, and a blanking plate 75 for connecting to the roof box at the connection interface, to blank off the normal passageway that exists into the roof box. The blanking plate 75 is mounted to the back box with extendable arms 74 which allow the height of the blanking plate to be raised and lowered relative to the back box. A flexible fabric 73 extends from a top of the back box to the blanking plate, and forms an enclosure around the back box and blanking plate, which, in effect, extends the height of the back box. The vehicle may be driven with the blanking plate 75 lowered against the top of the back box, and then the blanking plate 75 may be raised when the vehicle has reached its destination, to provide more space and headroom inside of the back box for if a user enters the back box.

The apparatus may also comprise stabiliser bars to resist side-to-side movement of the back box when the roof box is removed and the vehicle is in motion. FIG. 16 shows two stabiliser bars 78a and 78b, one at each side of the vehicle. Each stabiliser bar connects from the roof rack of the vehicle to the top of the back box, and in this embodiment a left side stabiliser bar 78a connects from the left side of the roof rack to the top left of the front panel 20f of the back box, and a right side stabiliser bar 78b connects from the right side of the roof rack to the top right of the front panel 20f of the back box.

Figure 17:
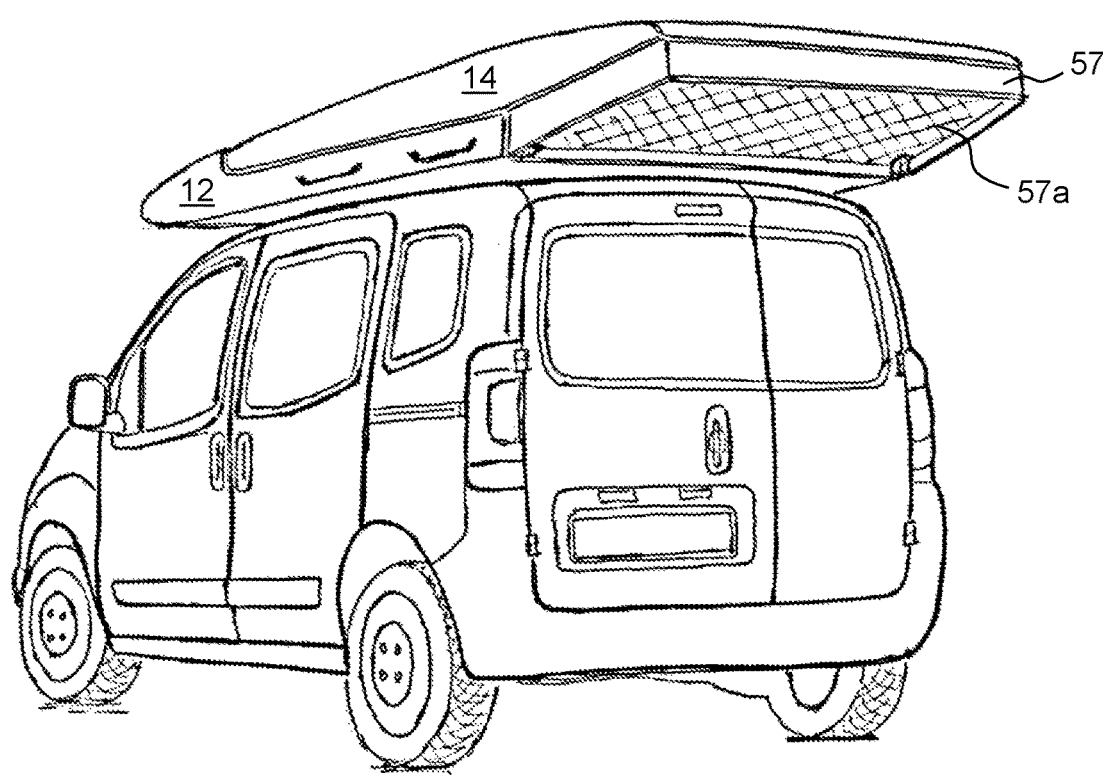
FIG. 17 shows a schematic perspective diagram of the roof box of FIG. 3 fitted to a vehicle, additionally comprising a blanking plate for the roof box.

In another example, FIG. 17 shows the roof box mounted to the vehicle without the back box. A blanking plate 57 for the roof box comprises a hatch 57a which is openable to allow a user to enter the roof box, for example to provide access to storage space or for sleeping inside the roof box.

Figure 18:
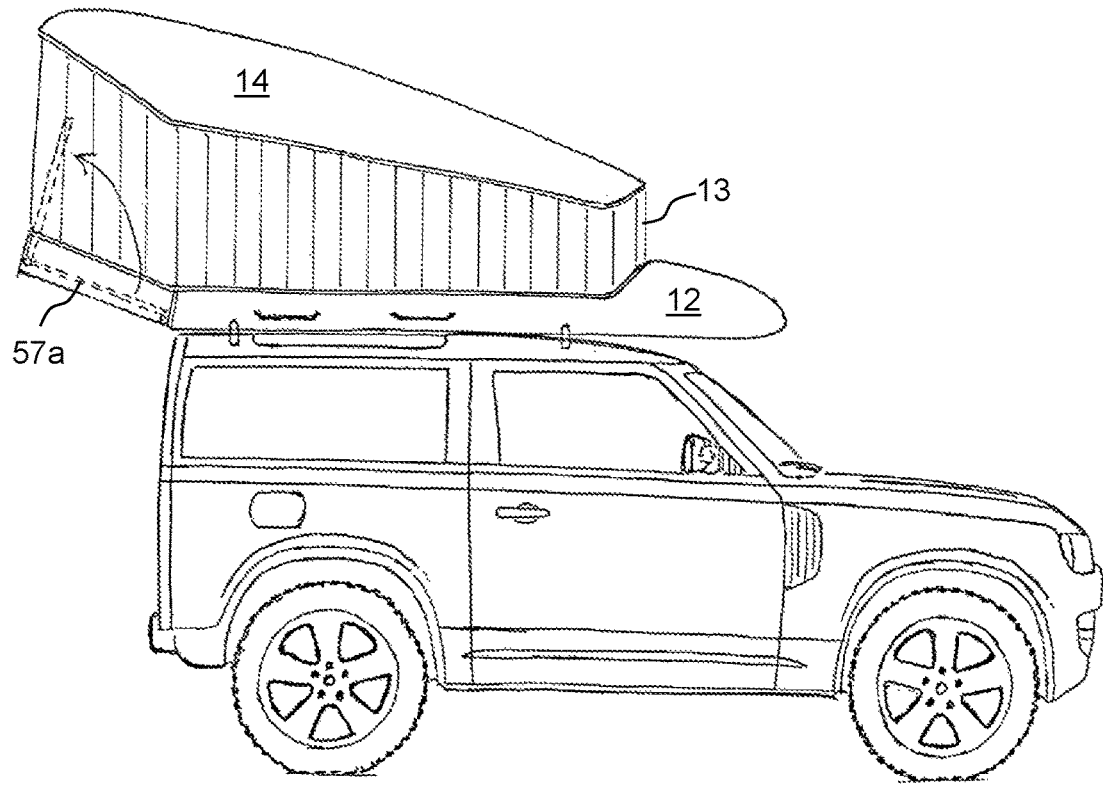
FIG. 18 shows a schematic perspective diagram of the roof box of FIG. 17, illustrating movement of a hatch in the blanking plate.

The opening of the hatch 57*a* is illustrated in FIG. 18, and in this embodiment the hatch 57*a* pivots upwardly into a space created when the top portion 14 of the roof box is opened upwardly from the base portion 12.

FIG. 19 shows a schematic diagram of an apparatus according to an alternative embodiment of the invention, the apparatus comprising a roof box 110 and a back box 120. The roof box 110 comprises a base portion 112 and a top portion 114 that can be raised upwardly from the base portion, similar to the base and top portions 12 and 14 of the roof box 10. However, in this embodiment the bottom rear of the top portion 114 extends horizontally, instead of sloping upwardly and rearwardly as in the embodiment of FIG. 1. The back box 120 is similar to the back box 20 of FIG. 1, but again the top of the back box is horizontal instead of sloping upwardly and rearwardly.

The connection interface along which the roof box abuts the back box comprises two portions, a first portion 125*a* extending only upwardly from the bottom of the roof box, and a second portion 125*b* extending only rearwardly (horizontally) from the first portion 125*a*. Therefore the connection interface extends upwardly and rearwardly from the bottom of the roof box 110 at point P11, to a point P12 at the top rear of the back box. As with the embodiment of FIG. 1, in FIG. 19 the roof box is longer than it would have been if the connection interface was only upward (vertical), and the back box is higher that it would have been if the connection interface was only rearward (horizontal). This is particularly relevant for when the roof box is fitted to the vehicle without the back box, or when the back box is fitted to the vehicle without the roof box.

The base portion 112 comprises two side panels 113 aligned along the length of the vehicle, and a curved front panel 111 in between and adjoining the side panels 113 at the front of the roof box. All of the external panels defining the outside shape of the roof box and back box of the FIG. 19 embodiment are substantially flat rather than curved to limit their cost, except for the panels 111 and 114 which are curved panels, and which may for example be formed of moulded fibreglass. The flat panels may for example be formed of a sandwich of aluminium and plastics materials, but use of alternative materials would of course be possible.

FIG. 20 shows a schematic diagram of an apparatus according to a further alternative embodiment of the invention, the apparatus comprising a roof box 210 and a back box 220. The roof box 210 comprises a base portion 212 and a top portion 214 that can be raised upwardly from the base portion, similar to the base and top portions 12 and 14 of the roof box 10. However, in this embodiment the base portion 212 extends rearwardly further than the top portion 214, and the rear side of the base portion 212 extends upwardly and rearwardly, instead of only upwardly. The back box 120 is similar to the back box 20 of FIG. 1, but the top of the back box slopes upwardly and rearwardly for the whole length of the back box, without any steps.

The connection interface 225 along which the roof box abuts the back box extends upwardly and rearwardly from a point P21 at the bottom side of the roof box, along the rear side of the roof box, to a point P22 at the top rear of the back box. As with the embodiment of FIG. 1, in FIG. 20 the roof box is longer than it would have been if the connection interface was only upward (vertical), and the back box is higher that it would have been if the connection interface was only rearward (horizontal).

Figure 21:
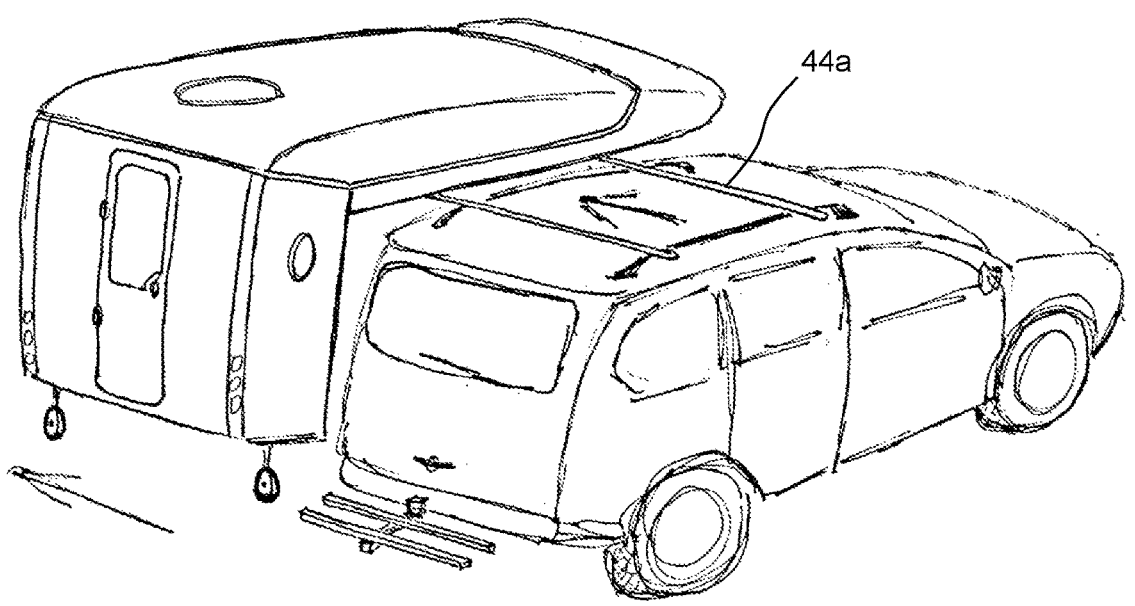
FIG. 21 shows a schematic perspective diagram of the apparatus of FIG. 1 when fitted with a further alternate rails and sliders allowing the apparatus to be slid sideways relative to the vehicle.

FIG. 21 shows a schematic diagram of the apparatus of FIG. 1 when fitted with further alternate rails 44*a* and sliders that allow the apparatus to be slid sideways relative to the vehicle.

Figure 22:
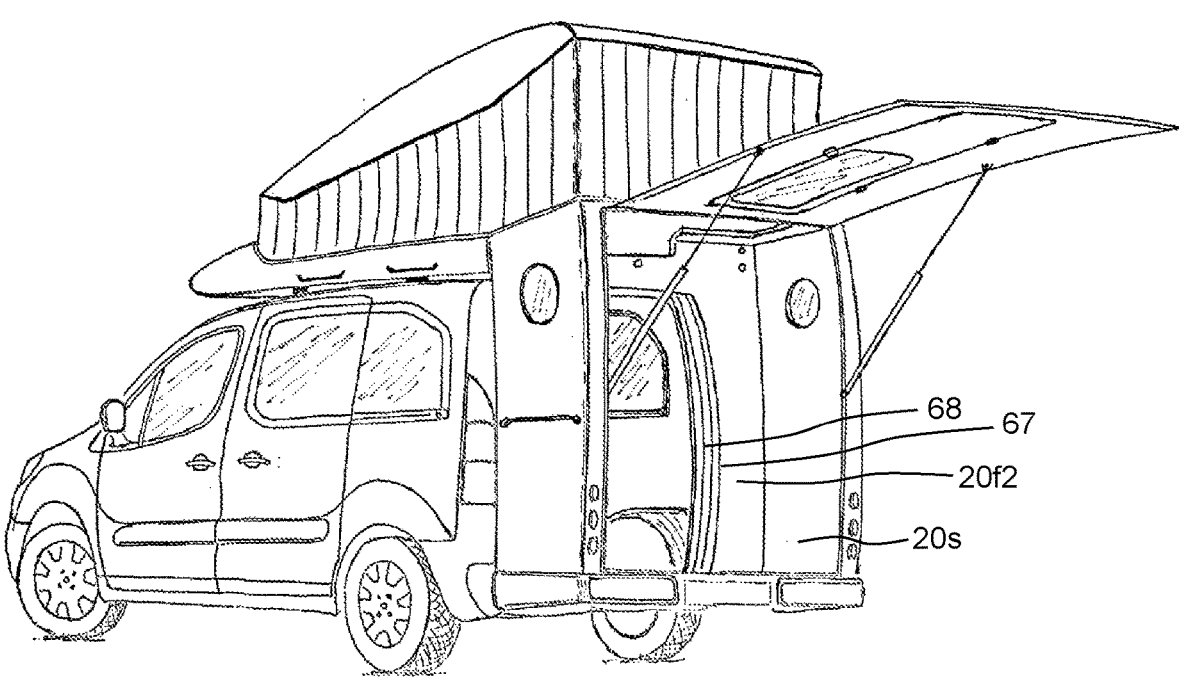
FIG. 22 shows a schematic perspective diagram of the apparatus of FIG. 1 with a modified back box.

FIG. 22 shows a schematic diagram of the apparatus of FIG. 1 with a modified back box. Specifically, the front panel 20/2 of the back box comprises an opening 67 for a person to move directly between the back box and the rear of the vehicle. The rear doors of the vehicle (a van) have been entirely removed, and a bellows 68 extends between the front of the back box and the rear of the vehicle, to seal the interior of the vehicle from the outside environment.

Many other variations of the described embodiments falling within the scope of the invention will also be apparent to those skilled in the art.

What is claimed is:

1. An apparatus for a vehicle, the apparatus comprising:
   a roof box for fitting to a roof of the vehicle having a length of the roof box orientated substantially parallel with a length of the vehicle, and
   a back box for fitting to a rear of the vehicle with a height of the back box orientated substantially parallel with a height of the vehicle,
   wherein the roof box and the back box connect along a connection interface that extends rearwardly and upwardly from a bottom of the roof box, and
   wherein the roof box and the rear box are repeatedly removable and attachable to one another at the connection interface.

2. The apparatus of claim 1, wherein the rearward and upward extension of the connection interface comprises at least one step defined by alternate rearwardly and upwardly extending portions of the connection interface.

3. The apparatus of claim 1, wherein the rearward and upward extension of the connection interface comprises a sloping connection interface that is non-orthogonal to the length of the roof box and the height of the back box.

4. The apparatus of claim 1, wherein the roof box comprises a base portion and a top portion adapted to open up from the base portion, and wherein the base portion of the roof box extends further forward than the top portion of the roof box, and wherein the top portion of the roof box extends further rearward than the base portion of the roof box.

5. The apparatus of claim 4, wherein the top portion and the base portion of the roof box are connected by an expandable intermediate portion that is configured to expand as the top portion is opened up from the bottom portion.

6. The apparatus of claim 4, wherein the connection interface extends along the base portion and not the top portion.

7. The apparatus of claim 4, wherein the connection interface extends along both the base portion and the top portion.

8. The apparatus of claim 1, wherein the connection interface extends to a top rear of the back box, the top rear of the back box being greater in height than the bottom of the roof box.

9. An apparatus for a vehicle, the apparatus comprising
   a roof box for fitting to a roof of the vehicle having a length of the roof box orientated substantially parallel with a length of the vehicle, and
   a back box for fitting to a rear of the vehicle with a height of the back box orientated substantially parallel with a height of the vehicle,
   wherein the roof box and the back box connect along a connection interface that extends rearwardly and upwardly from a bottom of the roof box, wherein the back box being adapted to attach to a tow hitch of the vehicle, wherein the back box comprises a mounting bracket for attaching to the tow hitch, and wherein the mounting bracket is height adjustable to raise and lower a height of the back box relative to the vehicle.

10. The apparatus of claim 1, wherein a front of the back box comprises a front window formed of a transparent material, wherein a rear of the back box comprises a rear window formed of a transparent material, and wherein the front window and the rear window are both in alignment with one another and are configured to align with a central region of a rear windscreen of the vehicle.

11. The apparatus of claim 1, further comprising a plurality of wind deflectors adapted to mount to the back box and to extend forwardly from the back box towards the vehicle.

12. The apparatus of claim 11, wherein the wind deflectors additionally mount to the roof box.

13. The apparatus of claim 12, wherein each wind deflector comprises a rear interface for mounting to the back box and a roof interface for mounting to the roof box, wherein the rear interface and roof interface extend perpendicular to one another.

14. An apparatus for a vehicle, the apparatus comprising:

a roof box for fitting to a roof of the vehicle having a length of the roof box orientated substantially parallel with a length of the vehicle, and a back box for fitting to a rear of the vehicle with a height of the back box orientated substantially parallel with a height of the vehicle, wherein the roof box and the back box connect along a connection interface that extends rearwardly and upwardly from a bottom of the roof box, wherein the back box comprises a rear door that is configured to hinge upwardly about hinges provided along a top rear edge of the back box.

15. The apparatus of claim 1, wherein the bottom of the roof box is configured to attach to roof bars or roof bar mounting points of the vehicle.

16. The apparatus of claim 15, wherein the bottom of the roof box comprises sliders configured to attach the bottom of the roof box to roof bars or roof rails of the vehicle, and wherein the sliders are configured to slide along the roof bars or roof rails, allowing the roof box to slide rearwardly relative to the vehicle.

17. The apparatus of claim 16, wherein, wherein the back box comprises retractable or removable legs configured to support the back box above ground level, and wherein the back box is detachable from the vehicle allowing the back box to move rearwardly together with the roof box relative to the vehicle.

18. The apparatus of claim 17, wherein, further comprising one or more fabric sheets configured to attach between the back box and the roof box once the back box and roof box have been slid rearwardly relative to the vehicle.

19. An apparatus for a vehicle, the apparatus comprising:

a roof box for fitting to a roof of the vehicle having a length of the roof box orientated substantially parallel with a length of the vehicle, and a back box for fitting to a rear of the vehicle with a height of the back box orientated substantially parallel with a height of the vehicle, wherein the roof box and the back box connect along a connection interface that extends rearwardly and upwardly from a bottom of the roof box, wherein the back box comprises an interior having steps or a ladder leading to an upper opening in the back box, through which an interior of the roof box is accessible.

* * * * *